(12) United States Patent
Kim

(10) Patent No.: US 10,465,900 B2
(45) Date of Patent: Nov. 5, 2019

(54) LED LIGHTING DEVICE HAVING PIPE SHAPE

(71) Applicant: LOGITEL CO., LTD., Seoul (KR)

(72) Inventor: Hyung Gyu Kim, Seoul (KR)

(73) Assignee: SFB LOGITEL INC., Seoul (KR)

( * ) Notice: Subject to any disclaimer, the term of this patent is extended or adjusted under 35 U.S.C. 154(b) by 0 days.

(21) Appl. No.: 15/775,001

(22) PCT Filed: Mar. 4, 2016

(86) PCT No.: PCT/KR2016/002173
§ 371 (c)(1),
(2) Date: May 9, 2018

(87) PCT Pub. No.: WO2017/086548
PCT Pub. Date: May 26, 2017

(65) Prior Publication Data
US 2018/0328582 A1    Nov. 15, 2018

(30) Foreign Application Priority Data

Nov. 19, 2015    (KR) .......................... 10-2015-0162304

(51) Int. Cl.
*F21V 33/00*    (2006.01)
*F21V 29/503*    (2015.01)
(Continued)

(52) U.S. Cl.
CPC .......... *F21V 33/0052* (2013.01); *F21S 6/002* (2013.01); *F21V 3/02* (2013.01); *F21V 3/0625* (2018.02);
(Continued)

(58) Field of Classification Search
CPC .... F21V 33/0052; F21V 29/503; F21V 29/83; F21V 3/0625; F21S 2/00; F21S 4/00; F21S 6/002; F21Y 2115/10
(Continued)

(56) References Cited

U.S. PATENT DOCUMENTS 9,279,561 B1 *   3/2016   Bohler ...................... F21K 9/27
2010/0079075 A1   4/2010   Son
(Continued)

FOREIGN PATENT DOCUMENTS

KR    20-0393986 Y1    8/2005
KR    10-0527009 B1    11/2005
(Continued)

*Primary Examiner* — Britt D Hanley
*Assistant Examiner* — Jessica M Apenteng
(74) *Attorney, Agent, or Firm* — Patent Office of Dr. Chung Park

(57) ABSTRACT

LED illumination apparatus having a pipe shape. An apparatus includes: an inner tube formed of light diffusion Polycarbonate; an outer tube formed of a transparent or semitransparent material and fitted to an outer surface of the inner tube; a coupling member having a cylindrical shape and a substrate seating part that has a flange shape and disposed at the center thereof; an LED substrate having a circular plate shape, fixedly mounted on the substrate seating part, and including LEDs that emit light toward the inner tube and an inner circumferential surface of the outer tube; and a finishing member having a circular plate shape with a hole and an extension part that has a certain height and protrudes in a vertical direction from an inner circumferential surface of the hole.

5 Claims, 7 Drawing Sheets

(51) Int. Cl.
*F21V 29/83* (2015.01)
*F21V 3/06* (2018.01)
*F21S 6/00* (2006.01)
*F21V 3/02* (2006.01)
*F21V 19/00* (2006.01)
*G06F 1/16* (2006.01)
*H05B 33/08* (2006.01)
*F21Y 115/10* (2016.01)
*F21W 131/30* (2006.01)
*F21Y 103/00* (2016.01)

(52) U.S. Cl.
CPC ........ *F21V 19/0035* (2013.01); *F21V 29/503* (2015.01); *F21V 29/83* (2015.01); *G06F 1/1607* (2013.01); *H05B 33/0857* (2013.01); *F21W 2131/30* (2013.01); *F21Y 2103/00* (2013.01); *F21Y 2115/10* (2016.08); *G06F 2200/1612* (2013.01)

(58) Field of Classification Search
USPC .......................................................... 362/218
See application file for complete search history.

(56) References Cited

U.S. PATENT DOCUMENTS

2015/0029742 A1  1/2015  Chen
2015/0276178 A1* 10/2015  Chien ..................... F21S 8/035
362/95

FOREIGN PATENT DOCUMENTS

KR    10-2010-0122634 A    11/2010
KR    20-2011-0002763 B    3/2011
KR    10-2015-0102434 A    9/2015

* cited by examiner

US 10,465,900 B2

LED LIGHTING DEVICE HAVING PIPE SHAPE

CROSS-REFERENCE TO PRIOR APPLICATIONS

This application is a national Stage Patent Application of PCT International Patent Application No. PCT/KR2016/002173, filed on Mar. 4, 2016 under 35 U.S.C. § 371, which claims priority of Korean Patent Application No. 10-2015-0162304, filed on Nov. 19, 2015, which are all hereby incorporated by reference in their entirety.

TECHNICAL FIELD

The present invention relates to a Light Emitting Diode (LED) illumination apparatus having a pipe shape, and more particularly, to an LED illumination apparatus having a pipe shape so as to provide an LED illumination giving an aesthetic feeling by radiating an LED light source at one end or both ends of a body of a specific structure including an inner tube and an outer tube.

BACKGROUND ART

In general, a light emitting diode (LED) generates minority carriers (electrons or positive holes) injected using a p-n junction structure of a semiconductor, and emits light by recombination of these carriers.

Currently, various products using LEDs are being developed and applied to various fields. In particular, since LED illumination apparatuses have the advantages of a semi-permanent lifetime and very low power consumption, they are expected to be able to replace various existing illumination apparatuses.

In other words, it is possible for LED illumination apparatuses to reduce environmental pollution by replacing existing electric lamps which contain various harmful substances and to save energy through low power consumption of the LED illumination.

On the other hand, a single-sided or double-sided monitor used for industrial and advertising purposes is usually configured to be fixedly installed on the upper end of a stand formed of an aluminum pipe having a certain length.

In this case, the stand supports the monitor and are embedded with various kinds of cables for driving a screen of the monitor, only allowing terminals and cables not to be exposed to the outside of the monitor. Accordingly, there is a limitation in satisfying consumers' demands to create more various aesthetic feelings through the monitor and the stand or to increase the visibility of the monitor.

DISCLOSURE

Technical Problem

The present invention provides an LED illumination apparatus having a pipe shape, which can provide LED illumination showing unique aesthetic feeling by radiating for radiating an LED light source on a specific structure including a pair of pipes having a certain length.

The present invention also provides to an LED illumination apparatus having a pipe shape, which can improve the visibility of a monitor as well as the unique aesthetic feeling by integrally mounting an illumination apparatus of a pipe shape on an outer circumferential surface of a stand of the stand-type monitor fixedly installed on a bottom part.

Technical Solution

In one general aspect, a Light Emitting Diode (LED) illumination apparatus having a pipe shape includes: an inner tube formed of a light diffusion Polycarbonate (PC) having a certain diameter and a certain length; an outer tube formed of a transparent or semitransparent material and fitted over and coupled to an outer circumferential surface of the inner tube; a coupling member having a cylindrical shape with upper and lower surfaces thereof opened, and is fixedly coupled to one end or both ends of the outer tube while a substrate seating part protrudes in a flange shape at the center of an inner circumferential surface of the coupling member; an LED substrate having a circular plate shape with a hole formed at the center thereof, fixedly mounted on the substrate seating part of the coupling member, and including a plurality of LEDs arranged on one surface thereof so as to emit a certain light source toward the inner tube and an inner circumferential surface of the outer tube; and a finishing member having a circular plate shape with a hole formed at the center thereof and coupled to the open surface of the coupling member mounted with the LED substrate to seal the inside thereof while an extension part having a certain height protrudes in a vertical direction from an inner circumferential surface of the hole.

An end portion of the inner tube and an end portion of the outer tube may be configured to have a step difference of about 2 mm to about 7 mm, and a gap of about 0.5 mm and about 1.5 mm may be formed between the outer circumference of the inner tube and the inner circumference of the outer tube.

A heat radiation guide groove for heat radiation may be concavely formed in a circular shape in a corresponding surface of the finishing member facing the LED substrate, and a plurality of heat radiation holes communicating with the outside may be formed in the heat radiation groove.

The LED illumination apparatus may be fitted in an outer circumferential surface of a stand of a stand type monitor, and an outer circumferential surface of an aluminum pipe constituting the stand may be coated with silver color.

The LED illumination apparatus may be controlled to emit light of various colors in linkage with an LED illumination apparatus provided in the stand-type monitor, or may be controlled to selectively emit light in flickering mode, flashing mode, and circulation mode in accordance with a control signal of an external controller.

Other features and aspects will be apparent from the following detailed description, the drawings, and the claims.

Advantageous Effects

According to an embodiment of the present invention as described above, it is possible to mount an LED illumination apparatus configured in a pipe shape so as to have a specific structure onto stands of various products such as an illumination apparatus or a monitor of independent type.

In this case, when the LED illumination apparatus is used as an independent type of illumination apparatus, the interior effect may be enhanced by utilizing the LED illumination apparatus for purposes such as a vase.

Also, when the LED illumination apparatus is integrally mounted on stands of various products types in addition to a stand of a stand-type monitor, a function as an LED illumination apparatus can be added by deviating from the function of a simple stand. Thus, the visibility of the corresponding product can be enhanced, and a unique aesthetic feeling can be expressed.

BEST MODE

Figure 1:
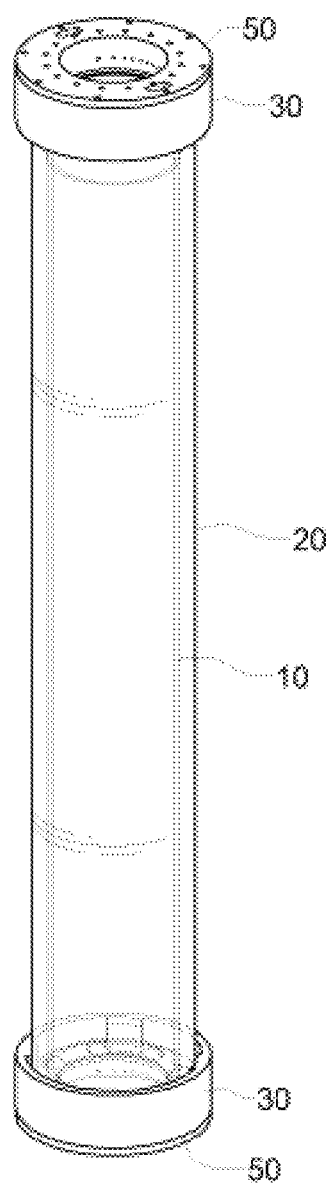
FIG. 1 is a perspective view illustrating an exterior of an LED illumination apparatus having a pipe shape according to an embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 2:
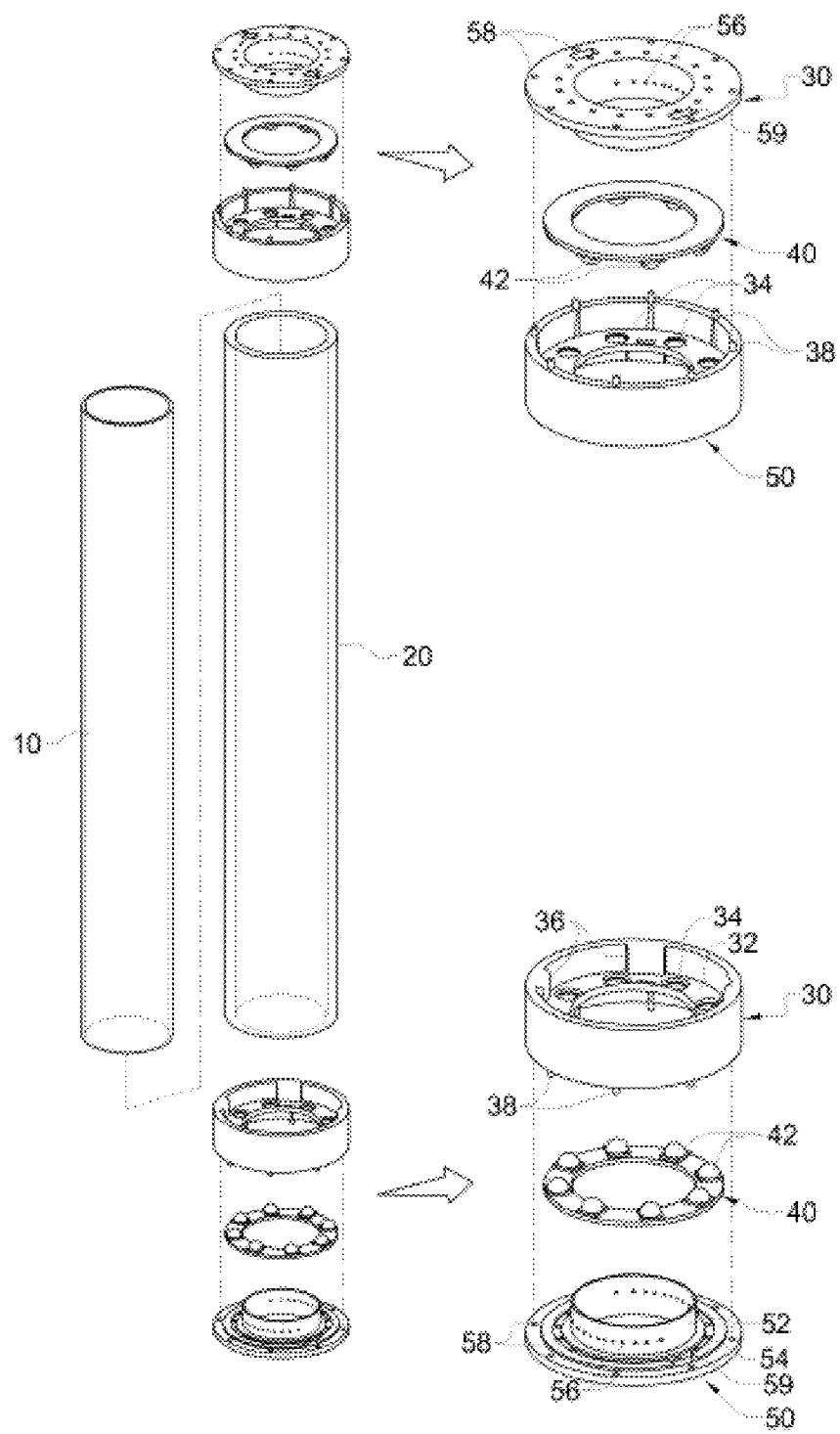
FIG. 2 is an exploded perspective view illustrating a configuration of an LED illumination apparatus having a pipe shape according to an embodiment of the present invention.
Figure 3:
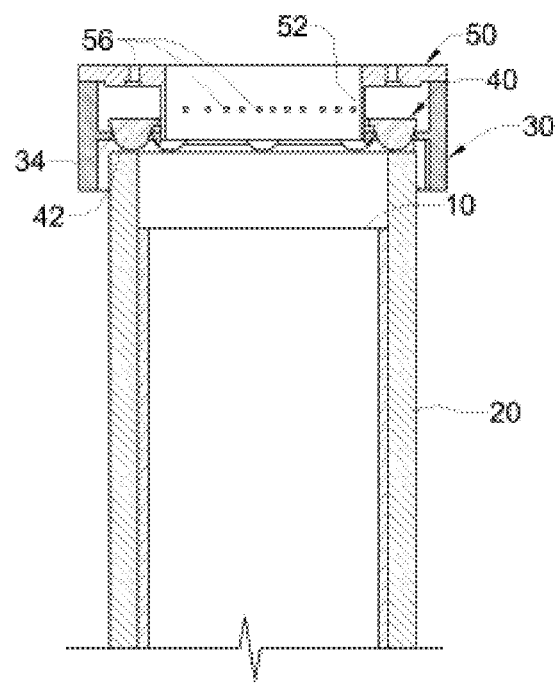
FIGS. 3 and 4 are partial cross-sectional views illustrating a configuration of an LED illumination apparatus having a pipe shape according to an embodiment of the present invention.
Figure 4:
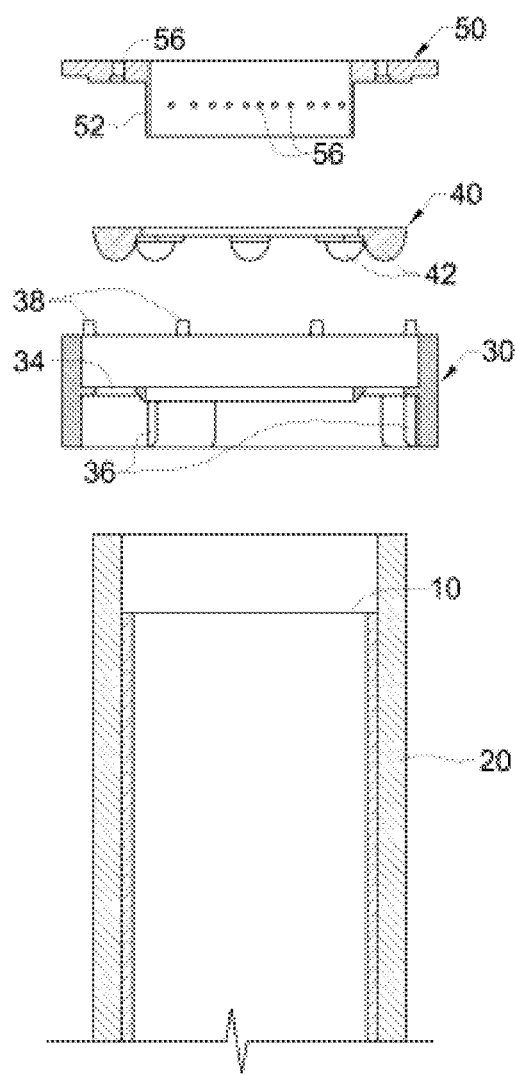
Figure 5:
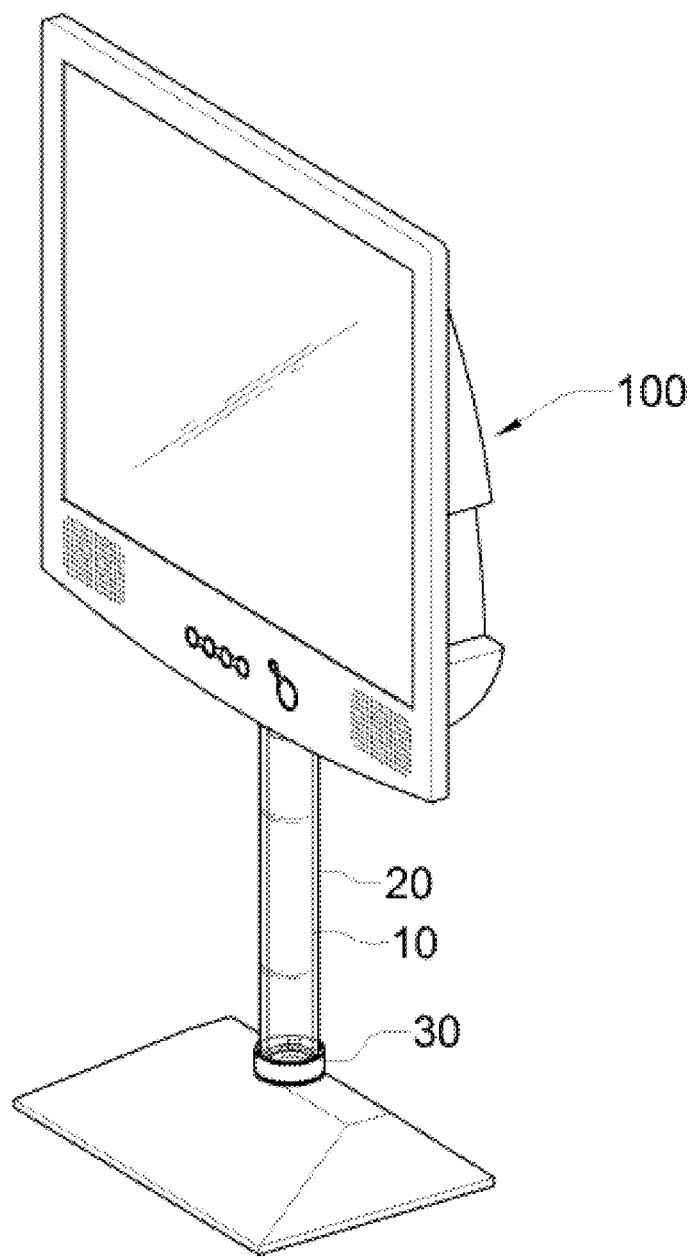
FIGS. 5 and 6 are a perspective view and an exploded perspective view illustrating a state in which an LED illumination apparatus having a pipe shape according to an embodiment of the present invention is applied to a stand-type monitor.
Figure 6:
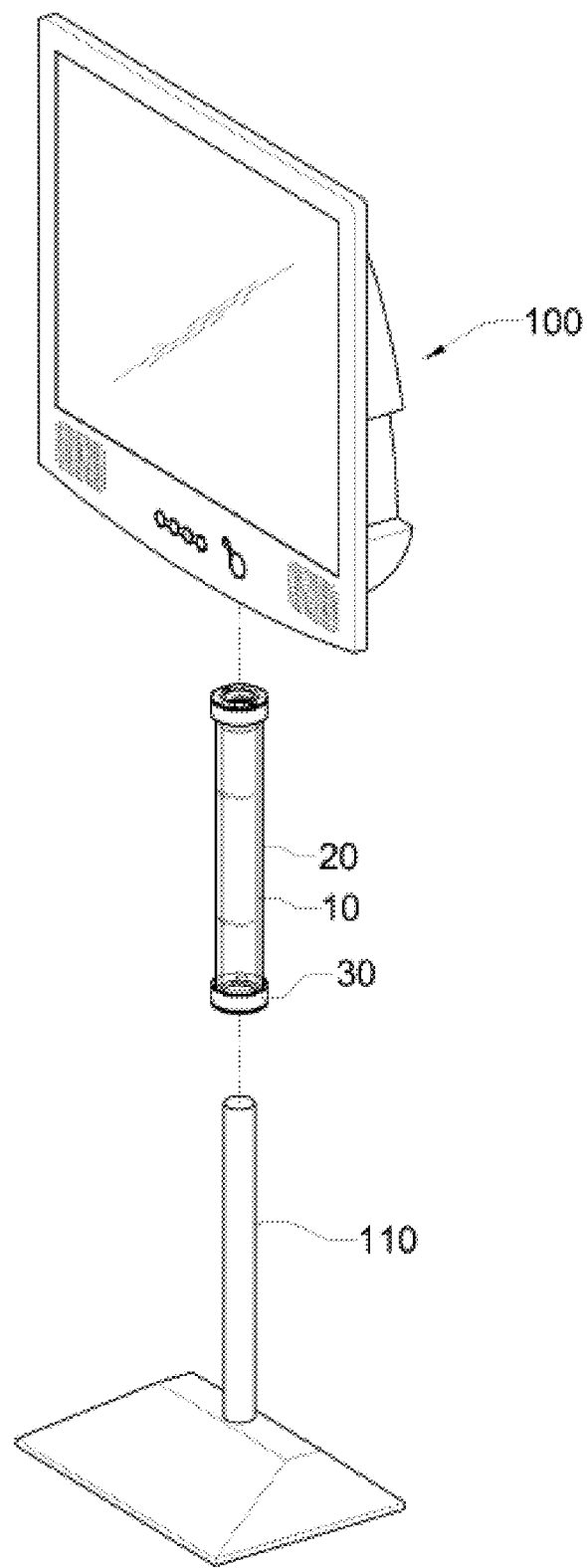
Figure 7:
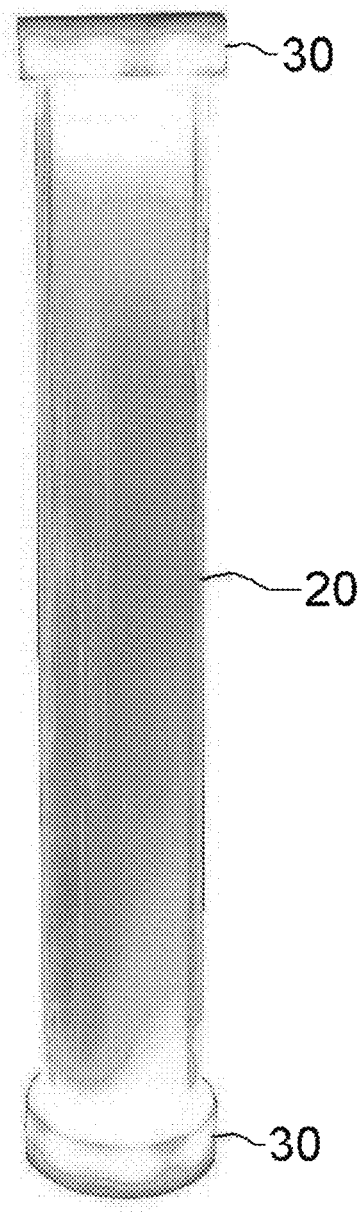
FIG. 7 is a view illustrating an operation state of an LED illumination apparatus having a pipe shape according to an embodiment of the present invention.

FIG. 1 is a perspective view illustrating an exterior of an LED illumination apparatus having a pipe shape according to an embodiment of the present invention. FIG. 2 is an exploded perspective view illustrating a configuration of an LED illumination apparatus having a pipe shape according to an embodiment of the present invention. FIGS. 3 and 4 are partial cross-sectional views illustrating a configuration of an LED illumination apparatus having a pipe shape according to an embodiment of the present invention. FIGS. 5 and 6 are a perspective view and an exploded perspective view illustrating a state in which an LED illumination apparatus having a pipe shape according to an embodiment of the present invention is applied to a stand-type monitor. FIG. 7 is a view illustrating an operation state of an LED illumination apparatus having a pipe shape according to an embodiment of the present invention.

First, an LED illumination apparatus having a pipe shape according to an embodiment of the present invention is implemented so as to provide LED illumination exhibiting a unique aesthetic feeling by radiating an LED light source on a body of a specific structure including a pair of pipes having a certain length, and to be utilized for various purposes.

For this, an LED illumination apparatus having a pipe shape according to an embodiment of the present invention includes an inner tube 10 and an outer tube 20 which have a certain lengths and diameters, a coupling member 30, an LED substrate 40 and a finishing member 50 which are mounted on one or both ends of an assembly of the inner tube 10 and the outer tube 20, and is configured to radiate a certain light source from the end portion of the tube to the center of the tube.

Here, the inner tube 10 is formed of a white light diffusion Polycarbonate (PC) pipe and has a length of about 30 cm to about 50 cm and a thickness of about 1 mm to about 5 mm, and the diameter of the outer circumferential surface of the inner tube 10 is configured to have a dimension of about 50 mm to about 60 mm (most preferably about 54 mm).

In this case, a light source is radiated from an LED 42 formed on the LED substrate 40 through an end portion of the inner tube 1, and the inner tube 1 serves as a light guide plate to diffuse light as much as possible. At this point, it is desirable that the cut surface of the end portion of the inner tube 10 is kept clean through a polishing process such that the directivity rate of the radiated LED light source can be maximized.

The outer tube 20 is formed of a transparent or semitransparent acrylic pipe, and the inner tube 10 is inserted into and coupled to the outer tube 20.

In this case, in a state where the inner tube 10 is fitted in the outer tube 20, the end portion of the inner tube 10 is designed to be shorter about 2 mm to about 7 mm (most preferably, about 4 mm) than the end portion of the outer tube 20, and thus there is a step difference between the inner tube 10 and the outer tube 2.

Also, a gap of about 0.5 mm to about 1.5 mm (most preferably, 1 mm) may be formed between the outer circumferential surface of the inner tube 10 and the inner circumferential surface of the outer tube 20.

An assembly of the coupling member 30, the LED substrate 40 and the finishing member 50 may be fixedly coupled to one end or both ends of the outer tube 20 embedded with the inner tube 10, and thus a light source from the LED 42 disposed on the LED substrate 40 may be radiated to the end portion of the inner tube 10 and the inner circumferential surface of the outer tube 20.

The coupling member 30 has a substantially cylindrical shape with upper and lower surfaces thereof opened. A substrate seating part 32 for mounting the LED substrate 40 is protrusively formed in a flange form at the center of the inner circumferential surface of the coupling member 30. A plurality of LED holes 34 are formed in the substrate seating part 32 such that the LEDs 42 arranged in the LED substrate 40 penetrate the plurality of LED holes 34.

A plurality of contact protrusions 36 that allow the coupling member 30 to fit in and make close contact with the end portion of the outer circumferential surface of the outer tube 20 are formed at a certain interval on inner circumferential surface of one side based on the substrate seating part 32 provided on the coupling member 30, and a plurality of coupling protrusions 38 are protrusively formed at the other end based on the substrate seating part 32 such that the finishing member 50 is inserted into and coupled thereto.

The LED substrate 40 has a substantially circular plate shape having an aperture formed at the center thereof, and is fixed to the substrate seating part 32 of the coupling member 30. The plurality of LEDs 42 arranged on one surface of the LED substrate 40 are installed so as to penetrate through the LED hole 34 of the substrate seating part 32 and radiate a certain light source to the end portion of the inner tube 10 and the inner circumferential surface of the outer tube 20.

The LEDs 42 provided on the LED substrate 40 may be formed of a lens having an angle of view of 45 degrees such that the light source is maximally directed toward the end portion of the inner tube 10 and the inner circumferential surface of the outer tube 20.

Also, a heat radiation tape (not shown) may be attached to the rear surface of the LED substrate 40 for smooth heat radiation.

The finishing member 50 has a substantially circular plate shape with a hole formed at the center thereof, and a plurality of engagement holes 58 corresponding to the engagement protrusions 38 of the coupling member 30 are formed along the edge portion of the finishing member 50. Also, an extension part 52 having a certain height protrudes in a vertical direction from the inner circumferential surface of the hole of the finishing member 50 to form a substantially tubular shape. Thus, the finishing member 50 is configured to seal the inside of the coupling member 30 mounted with the LED substrate 40 while being coupled to the open surface of the coupling member 30 by the medium of the engagement protrusions 38 and the engagement holes 58 corresponding to each other.

Also, a heat radiation guide groove 54 is concavely formed in a substantially circular shape in a corresponding surface of the finishing member 50 facing the LED substrate 40, and a plurality of heat radiation holes 56 are formed in the heat radiation guide groove 54 and the extension part 52 so as to communication with the outside.

The reference numeral 59 denotes a cable hole into which a cable connected to an external power supply unit and a controller for driving the LED substrate 40 embedded in the coupling member 30 is drawn.

On the other hand, as shown in FIGS. 5 and 6, an LED illumination apparatus having a pipe shape according to an embodiment of the present invention is installed on the outer circumferential surface of a stand 110 of a one-sided or double-sided monitor 100 of a stand type, thereby exhibiting a unique aesthetic feeling.

In this case, when the LED illumination apparatus is applied to the stand 110, the outer circumferential surface of the stand formed of an aluminum pipe may be coated with silver color or the like such that the illumination of a light source emitted from the LED is prevented from being reduced by the stand 110 having a dark color.

Also, when the LED illumination apparatus is applied to a stand-type monitor as described above, the LED illumination apparatus may be controlled to emit various colors in linkage with an LED illumination apparatus (not shown) provided in the monitor 100.

Also, when the LED illumination apparatus is connected to a stand-type monitor or an external controller, the LED illumination apparatus may be controlled to sequentially emit light of colors such as red-orange-yellow-green-blue according to a certain control signal, or may be controlled to selectively emit light by flickering mode, flashing mode, circulation mode, etc.

Hereinafter, the operation of the LED illumination apparatus as described above will be described with reference to the accompanying drawings.

First, an LED illumination apparatus having a pipe shape according to an embodiment of the present invention may be manufactured to have various lengths and diameters in accordance with the usage environment and purpose of the illumination apparatus.

Also, the LED illumination apparatus may be used as a mood lamp as an independent illumination apparatus, or may be applied to a vase, etc. to enhance the interior effect. Alternatively, as shown in FIGS. 5 and 6, the LED illumination apparatus may be integrally mounted onto the stand 110 of the stand-type monitor 100 so as to improve the visibility of the monitor in addition to the unique aesthetic feeling.

In the operation of the LED illumination apparatus, as certain power and control signals are applied to the LED substrate 40 through an external power supply unit and a controller (not shown), a plurality of LEDs 42 disposed in the LED substrate 40 is driven.

Thus, the plurality of LEDs 42 provided on the LED substrate 40 radiate a light source toward the front of the LEDs 42. In this case, the light source emitted from the LEDs 42 is radiated toward the end portion of the inner tube 10 formed of a white light diffusion PC and a gap between the inner tube 10 and the outer tube 20, and then is diffused to the outside through the outer tube 20 while light maximally diffuses through the diffusion action of the inner tube 10 serving as a light guide plate.

Accordingly, as shown in FIG. 7, the LED illumination apparatus according to an embodiment of the present invention may be implemented as an illumination lamp having a unique shape through a body formed into a pipe shape. In particular, as shown in FIGS. 5 and 6, as the LED illumination apparatus is applied to the stand 110 of the stand-type monitor 100, it is possible to provide a unique aesthetic feeling as if the monitor is mounted on the upper part of the LED illumination apparatus.

On the other hand, high-temperature heat of generated from the plurality of LEDs 42 according to the operation of the LED illumination apparatus may be primarily radiated through the heat radiation tape attached to the rear surface of the LED substrate 40, and may be guided through the heat radiation guide groove 54 formed in the finishing member 50 and then be smoothly radiated to the outside through the plurality of heat radiation holes 56.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A Light Emitting Diode (LED) illumination apparatus having a pipe shape, the apparatus comprises:
    an inner tube formed of a light diffusion Polycarbonate (PC) having a certain diameter and a certain length;
    an outer tube formed of a transparent or semitransparent material and fitted over and coupled to an outer circumferential surface of the inner tube;
    a coupling member having a cylindrical shape with upper and lower surfaces thereof opened, and is fixedly coupled to one end or both ends of the outer tube while a substrate seating part protrudes in a flange shape at the center of an inner circumferential surface of the coupling member;
    an LED substrate having a circular plate shape with a hole formed at the center thereof, fixedly mounted on the substrate seating part of the coupling member, and comprising a plurality of LEDs arranged in a circular configuration on one surface thereof so as to emit a certain light toward the inner tube and an inner circumferential surface of the outer tube; and a finishing member having a circular plate shape with a hole formed at the center thereof and coupled to the open surface of the coupling member mounted with the LED substrate to seal the inside thereof while an extension part having a certain height protrudes in a vertical direction from an inner circumferential surface of the hole;

wherein each of the inner tube and outer tube has a shape of pipe that is dimensioned to receive a pipe-shaped stand therethrough; and where each of the coupling member, the LED substrate and the finishing member has a hole formed at a center through which the pipe-shaped stand passes.

2. The apparatus of claim 1, wherein an end portion of the inner tube and an end portion of the outer tube are configured to have a step difference of about 2 mm to about 7 mm, and a gap of about 0.5 mm and about 1.5 mm is formed between the outer circumference of the inner tube and the inner circumference of the outer tube.

3. The apparatus of claim 1, wherein a heat radiation guide groove for heat radiation is concavely formed in a circular shape in a corresponding surface of the finishing member facing the LED substrate, and a plurality of heat radiation holes communicating with the outside are formed in the heat radiation groove.

4. The apparatus of claim 1, wherein, an outer circumferential surface of an aluminum pipe constituting the stand is coated with silver color.

5. The apparatus of claim 4, wherein the LED illumination apparatus is controlled to emit light of various colors in linkage with an LED illumination apparatus provided in the stand-type monitor, or is controlled to selectively emit light in flickering mode, flashing mode, and circulation mode in accordance with a control signal of an external controller.

* * * * *